United States Patent
Motchenbacher et al.

(10) Patent No.: US 7,157,073 B2
(45) Date of Patent: *Jan. 2, 2007

(54) PRODUCTION OF HIGH-PURITY NIOBIUM MONOXIDE AND CAPACITOR PRODUCTION THEREFROM

(75) Inventors: Charles A. Motchenbacher, Robesonia, PA (US); James W. Robison, Lititz, PA (US); Brian J. Higgins, Reading, PA (US); Thomas J. Fonville, Reading, PA (US)

(73) Assignee: Reading Alloys, Inc., Robesonia, PA (US)

( * ) Notice: Subject to any disclaimer, the term of this patent is extended or adjusted under 35 U.S.C. 154(b) by 580 days.

This patent is subject to a terminal disclaimer.

(21) Appl. No.: 10/428,430

(22) Filed: May 2, 2003

(65) Prior Publication Data

US 2004/0219094 A1   Nov. 4, 2004

(51) Int. Cl.
*C01G 33/00*   (2006.01)
(52) U.S. Cl. .................... 423/594.17; 423/62
(58) Field of Classification Search .......... 423/594.17, 423/62; 241/3, 22, 23; 264/5, 118, 402, 264/403, 404, 681
See application file for complete search history.

(56) References Cited

U.S. PATENT DOCUMENTS

| | | | |
|---|---|---|---|
| 3,635,693 A | 1/1972 | Friedrich et al. | |
| 5,242,481 A | 9/1993 | Kumar | |
| 5,993,513 A | 11/1999 | Fife | |
| 6,391,275 B1 | 5/2002 | Fife | |
| 6,416,730 B1 | 7/2002 | Fife | |
| 6,576,099 B1 * | 6/2003 | Kimmel et al. | 204/291 |
| 6,639,787 B1 | 10/2003 | Kimmel et al. | |
| 2003/0104923 A1 | 6/2003 | Omori et al. | |

FOREIGN PATENT DOCUMENTS

| | | |
|---|---|---|
| EP | 1 075 884 | 2/2001 |
| WO | WO 98/35920 | 8/1998 |
| WO | WO 98/45210 | 10/1998 |
| WO | WO 98/49356 | 11/1998 |
| WO | WO 99/57739 | 11/1999 |
| WO | WO 99/64638 | 12/1999 |
| WO | WO 00/15555 | 3/2000 |
| WO | WO 00/15556 | 3/2000 |
| WO | WO 00/56486 | 9/2000 |
| WO | WO 00/57993 | 10/2000 |
| WO | WO 00/69588 | 11/2000 |
| WO | WO 01/59166 | 8/2001 |
| WO | WO 01/64374 | 9/2001 |
| WO | WO 01/71738 | 9/2001 |

OTHER PUBLICATIONS

Yan, et al., "Production of Niobium Powder by Direct Electrochemical Reduction of Solid $Nb_2O_5$ in a Eutectic $CaCl_2$-NaCl Melt", *Metallurgical and Materials Transactions B*, vol. 33B, Oct. 2002, pp. 685-693.

Yan, et al., "Using Electro-Deoxidation to Synthesize Niobium Sponge from Solid $Nb_2O_5$ in Alkali-Alkaline-Earth Metal Chloride Melts", *J. Mater. Res.*, vol. 18, No. 2, Feb. 2003, pp. 346-356.

* cited by examiner

*Primary Examiner*—Steven Bos
(74) *Attorney, Agent, or Firm*—Duane Morris LLP

(57) ABSTRACT

The present invention relates to high-purity niobium monoxide powder (NbO) produced by a process of combining a mixture of higher niobium oxides and niobium metal powder or granules; heating and reacting the compacted mixture under controlled atmosphere to achieve temperatures greater than about 1800° C., at which temperature the NbO is liquid; solidifying the liquid NbO to form a body of material; and fragmenting the body to form NbO particles suitable for application as e.g., capacitor anodes. The NbO product is unusually pure in composition and crystallography, highly dense, and can be used for capacitors and for other electronic applications. The method of production of the NbO is robust, does not require high-purity feedstock, and can reclaim value from waste streams associated with the processing of NbO electronic components.

8 Claims, 3 Drawing Sheets

PRODUCTION OF HIGH-PURITY NIOBIUM MONOXIDE AND CAPACITOR PRODUCTION THEREFROM

FIELD OF THE INVENTION

The present invention relates to methods of producing niobium monoxide powders of high purity, and the use of such niobium monoxide powders in the production of valve devices, i.e., capacitors.

BACKGROUND OF THE INVENTION

It has been long recognized that niobium monoxide (NbO) has some unusual electrical properties that make it well-suited for the manufacture of electronic capacitors. For example, it is of much lower flammability than equivalent tantalum powders, is less costly than tantalum, and has a much larger potential supply than tantalum. However, niobium monoxide capacitor powders require high levels of purity, with not only foreign elements such as iron and copper being deleterious, but other forms of niobium such as niobium metal, niobium dioxide ($NbO_2$), niobium trioxide ($Nb_2O_3$) and niobium pentoxide ($Nb_2O_5$) being potentially harmful as well. In order to be useful in a valve application, the niobium monoxide should be in a finely divided form, i.e., a fine powder or agglomerates formed from small particles, typically 1–2 microns in diameter, or finer. In order to meet these prerequisites, the electronics industry has produced niobium monoxide by reacting niobium pentoxide or niobium dioxide (possibly pre-reduced from the pentoxide) with a metallic reducing agent under conditions in which the niobium oxides remain in the solid state. This allows the particle morphology of the original oxide to be preserved in the niobium monoxide.

In one embodiment of this process, niobium pentoxide is reacted at temperatures of approximately 1000° C. with finely divided metallic niobium in such stoichiometric proportions as to produce primarily niobium monoxide. In another embodiment, the niobium pentoxide or niobium dioxide is reacted with gaseous magnesium, similarly at temperatures of approximately 1000° C. This results in a "spongy" niobium monoxide-magnesium oxide mixture. After leaching the magnesium oxide, the resultant product is a high-surface area, agglomerated mass of niobium monoxide.

Because of the low processing temperatures used in these methods of producing niobium monoxide, there is inadequate opportunity to remove impurities in either the niobium oxide or the reducing agent feedstock. The purity requirements of the niobium monoxide dictate the purity required of the feedstock. The surface area requirements of the product niobium monoxide further dictate the particle size distribution and morphology of the niobium pent-or-dioxide required for the process. These requirements severely limit the availability of suitable raw materials. In addition, because the reactions occur in the solid state, the reactions are sluggish, and often do not go to completion. The product contains some higher oxides of niobium, and often some niobium metal.

Thus, an object of the present invention is to produce niobium monoxide (NbO) powder of high purity and sufficient surface area to meet the requirements of NbO capacitors without the constraints of raw materials purity and particle size imposed by solid-state processes, and further to the use of such powders in the production of capacitors.

SUMMARY OF THE INVENTION

The present invention relates to a high-purity niobium monoxide powder, produced by a process comprising:

(a) combining a mixture of niobium pentoxide, niobium trioxide and/or niobium dioxide and coarse niobium metal powder in effective amounts stoichiometrically calculated to yield a product with a fixed atomic ratio of niobium to oxygen, the ratio being preferably close to 1:1;

(b) forming a compact of the mixture by cold isostatic pressing or other appropriate techniques;

(c) exposing the compact to a heat source sufficient to elevate the surface temperature above the melting point of the product niobium monoxide, i.e., greater than about 1800° C. in an atmosphere suitable to prevent uncontrolled oxidation;

(d) allowing the mixture to react exothermically to produce the desired niobium monoxide;

(e) solidifying the mixture to form a solid body of niobium monoxide; and (f) fragmenting the body to form the desired particle size of niobium monoxide.

Capacitor anodes can thereby be produced from niobium oxide particles, by techniques common to the capacitor industry.

In preferred embodiments, the weight ratio of $Nb_2O_5$ to metallic niobium in the mixture is about 1:1; the weight ratio of $NbO_2$ to metallic niobium in the mixture is about 1.3:1; and the weight ratio of $Nb_2O_3$ to metallic niobium in the mixture is about 2.5:1. The heat source is preferably an electron beam furnace, a plasma-arc furnace, an induction furnace, or an electric resistance furnace.

BRIEF DESCRIPTION OF THE DRAWINGS

The accompanying drawings illustrate preferred embodiments of the invention as well as other information pertinent to the disclosure, in which.

DESCRIPTION OF THE PREFERRED EMBODIMENTS

The present invention relates to a method of producing niobium monoxide powder, which includes combining a mixture of $Nb_2O_5$, $Nb_2O_3$ and/or $NbO_2$, and niobium metal, forming a compacted bar of the mixture; reacting the mixture at a temperature greater than about 1800° C.; solidifying the reaction products; and fragmenting the solidified body to form niobium monoxide powder. In a preferred embodiment of the present invention, the weight ratio of niobium pentoxide to niobium metal is about 1:1.

The present invention also relates to the production of a high-purity niobium monoxide powder produced by this process from impure niobium pentoxide and/or impure niobium dioxide, and from impure niobium metal powder. In the present invention, the high processing temperature, controlled atmosphere and presence of a liquid state may be exploited to remove major impurities, including iron, aluminum, and various other elements other than oxygen and refractory metals.

In the testing of the present invention, a mixture of commercially available, 99.99% pure $Nb_2O_5$ and commercially available, electron-beam triple-refined dehydrided niobium metal powder (50×80 US mesh) was blended and formed into a bar by cold isostatic pressing, although other means of compaction and resultant physical forms would also be effective. Three such bars were prepared.

The compacts of $Nb_2O_5$ and niobium metal (weight ratio 1:1) were each fed sequentially into the melting region of an electron beam vacuum furnace, where each compact reacted and liquefied when heated by the electron beam, with the liquid product dripping into a cylindrical, water-cooled copper mold. When the electron beam initially struck the compact, melting immediately took place, with only a small increase in chamber pressure. A production rate of 100 pounds an hour was established. Reaction was terminated before the final compact had been fully consumed, leaving a layer of partially-reacted materials on the face of the residual compact.

While an electron-beam furnace was used in this experiment, it is anticipated that other energy sources capable of heating the materials to at least 1800° C. could also be used, including, but not limited to, cold crucible vacuum induction melting, plasma inert gas melting, and electrical impulse resistance heating.

The resultant ingot was allowed to cool under vacuum, and the apparatus was vented to atmosphere. Samples were taken from the top one inch of the ingot (the "top" samples), while "edge" samples were taken from lower mid-radius locations in the ingot.

Figure 1A:
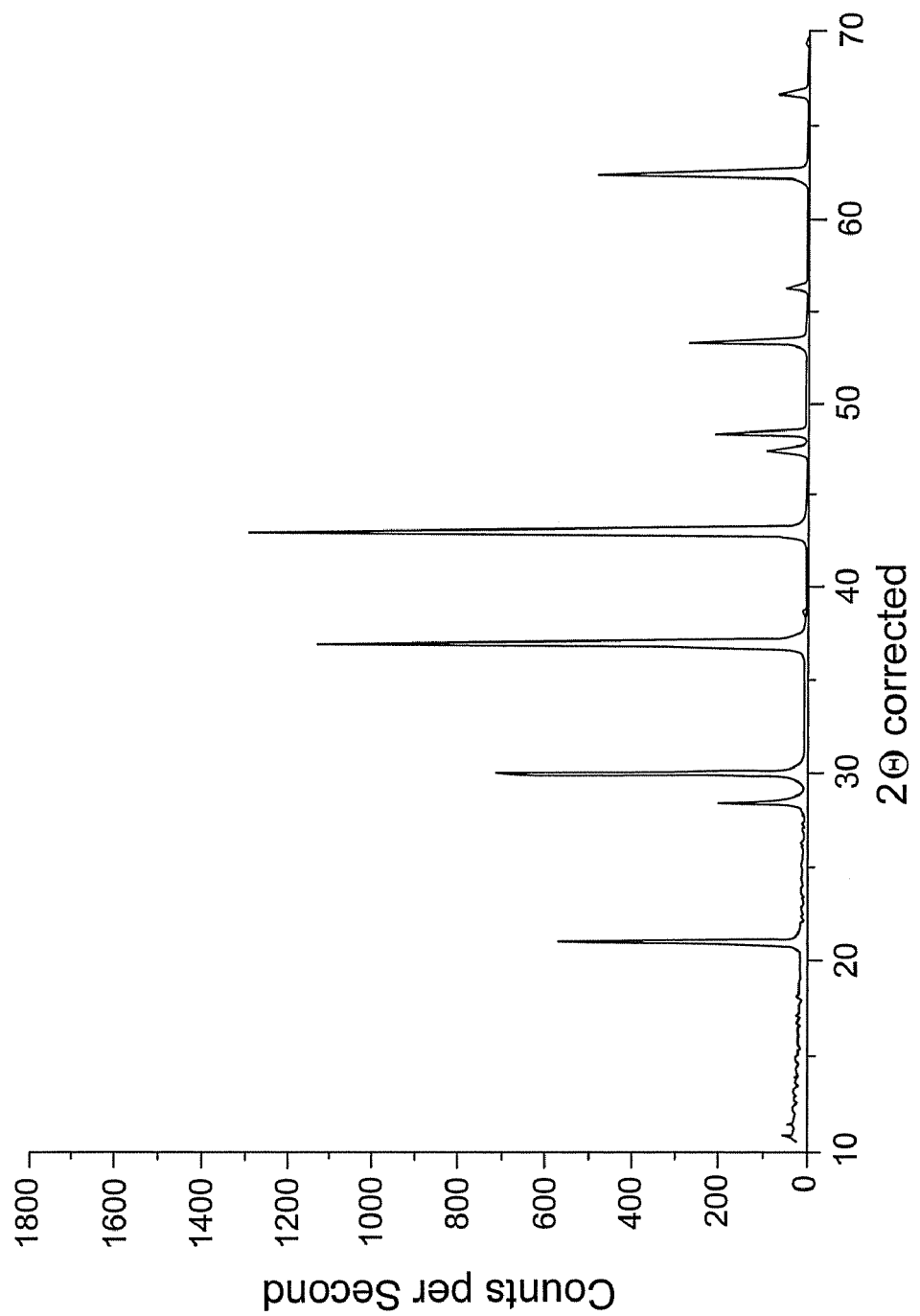
FIGS. 1a–c are graphs of x-ray diffraction patterns for NbO produced by the present invention (FIGS. 1a–b), and NbO produced by a commercial, solid-state reaction (FIG. 1c).
Figure 1B:
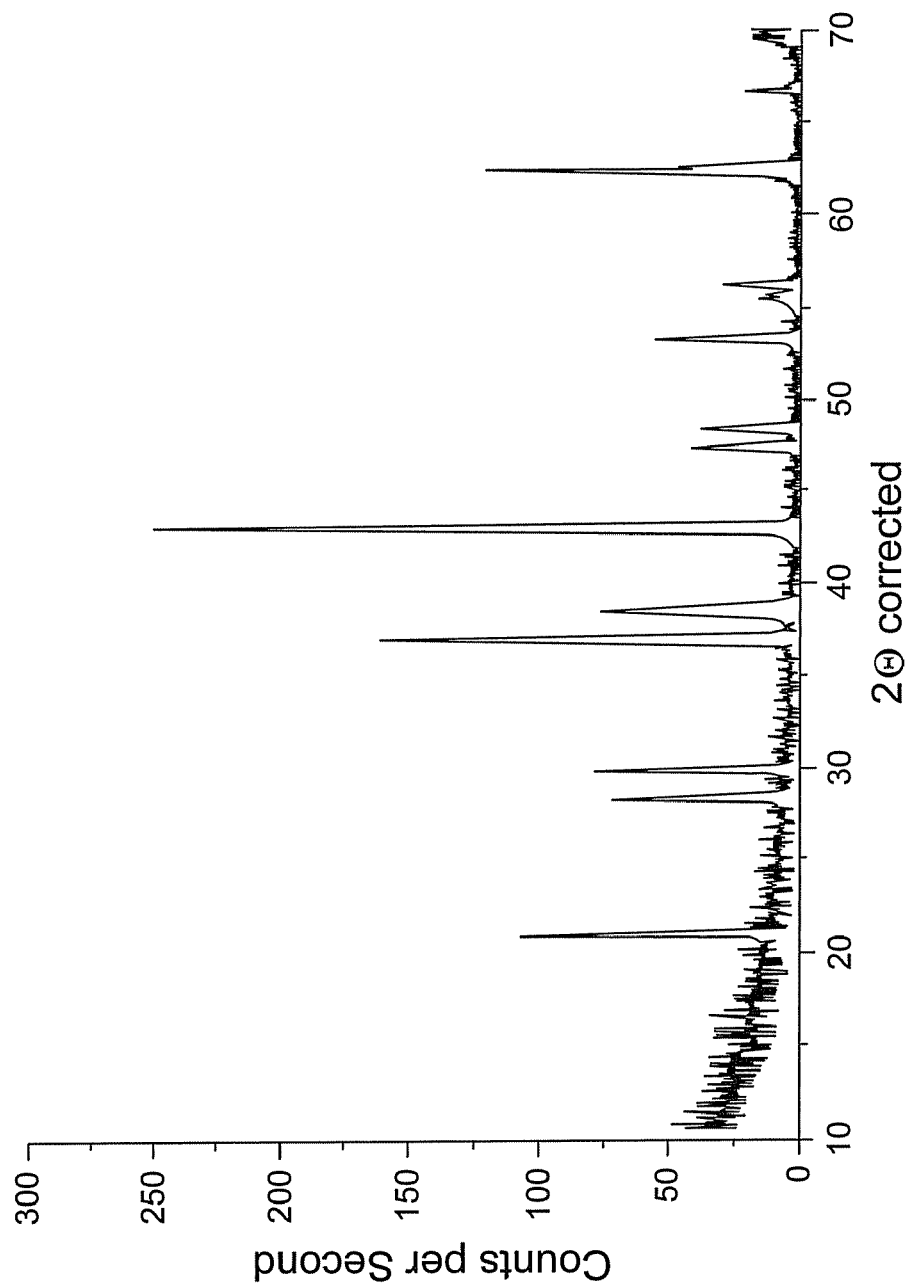
Figure 1C:
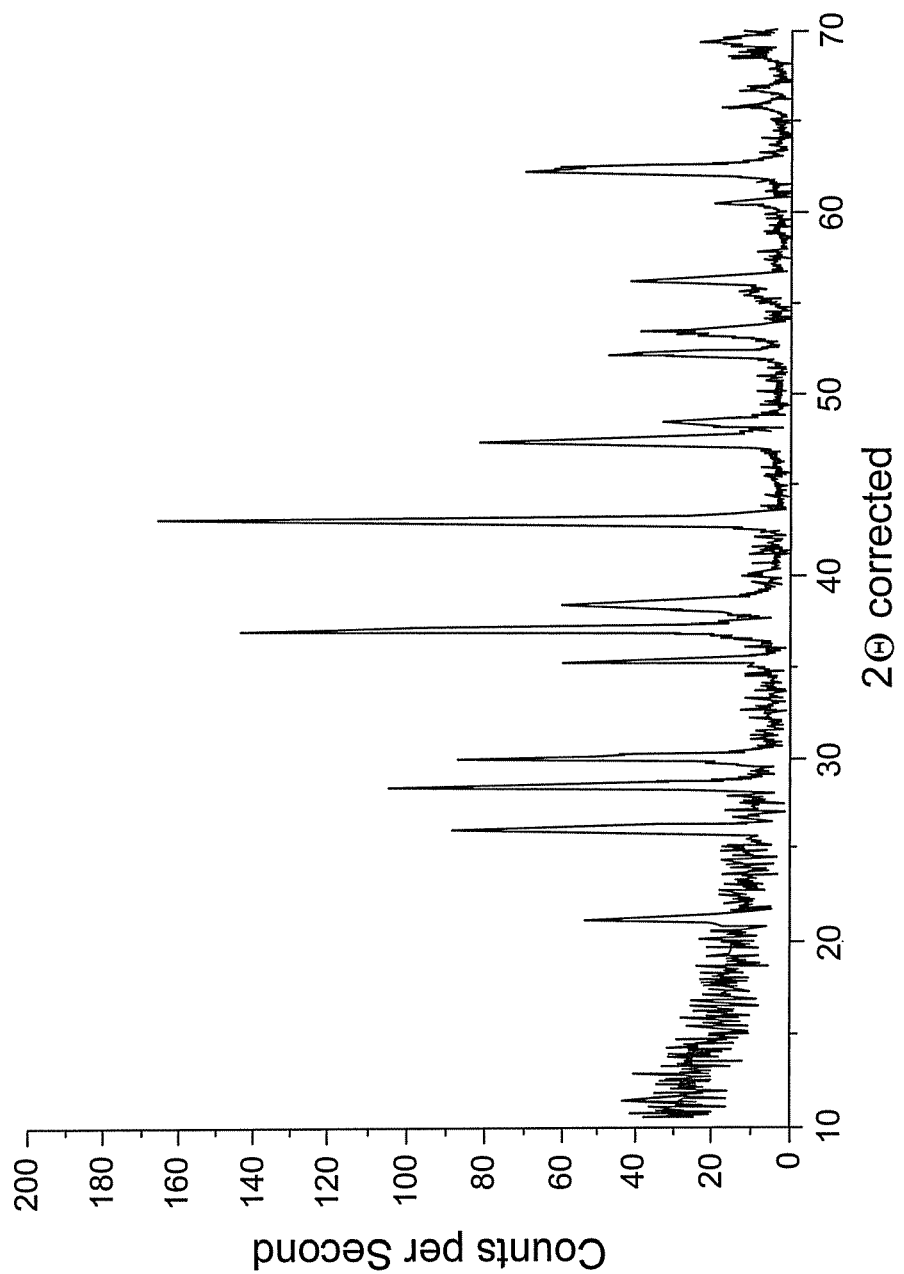

Subsequent analysis of the product NbO samples by x-ray diffraction showed a "clean" pattern for NbO, with no additional lines attributable to niobium metal, $NbO_2$ or $Nb_2O_3$. In FIG. 1 the x-ray diffraction patterns are shown for NbO produced by the present invention, (edge sample in FIG. 1a, top sample in FIG. 1b) and NbO produced by a commercial, solid-state reaction (FIG. 1c). The solid-state reaction product had numerous lines not originating with NbO, indicating the presence of other, undesirable phases.

The ingot was then degraded to powder by conventional crushing, grinding and milling techniques. The resultant NbO powder had a Microtrac D50 of 2.38 microns and a B.E.T. surface area of 2.06 $m^2$/gram. When formed into a capacitor anode under conventional conditions (Forming Voltage 35 V; Forming current 150 mA/g, sintered at 1400° C.), the anodes showed specific capacitance at a 2 volt bias of 60,337 CV/g and a DC Leakage of 0.31 nA/CV. Tested with a 0 volt bias, the specific capacitance was 78,258 CV/g and the DC Leakage was 0.23 nA/CV. All of these values are well within the normal range for commercial capacitors produced from NbO made by solid-state reactions, as well as some tantalum capacitors.

Four additional experimental runs were performed using less pure feedstock and altering the sizing of the feedstock used to make the compacts. In each run, the product was NbO free of other compounds and free of metallic niobium. This indicated that the subject process was robust and not dependent on particular sources of oxides or niobium metal. In one experimental run, the niobium pentoxide used as feedstock contained approximately 400 ppm of iron, and the niobium metal contained less than 50 ppm of iron. After converting the feedstock to NbO by the process of the present invention, the NbO was analyzed and found to contain less than 100 ppm of iron. This indicated a reduction of at least 50% in the iron content during the process.

The NbO ingot from each of these four additional experimental runs was reduced in size by conventional crushing, grinding and milling to an average particle size under 2.5 microns, formed into test anodes, and tested for capacitance and leakage rates. The results in each case were similar to the initial results described above, including anodes produced from NbO originating from the high-iron feedstock.

The process of the present invention also serves to recover NbO values from waste streams associated with production of powder-based NbO products, since the refining action of the present invention can effectively remove most contaminants, even when such contaminants are present as fine or micro-fine powders or particles.

The formation of niobium monoxide by melt phase processing lends itself to the recovery and remelting of niobium monoxide solids, including but not limited to powders, chips, solids, swarf (fine metallic filings or shavings) and sludges. Off-grade powder, recycled capacitors and powder production waste are among the materials that can be reverted to full value niobium monoxide by this process.

While the present invention has been described with respect to particular embodiment thereof, it is apparent that numerous other forms and modifications of the invention will be obvious to those skilled in the art. The appended claims and this invention generally should be construed to cover all such obvious forms and modifications, which are within the true spirit and scope of the present invention.

What is claimed is:

1. A method of producing niobium monoxide (NbO) powder which comprises:
   a) combining a mixture of (1) a niobium oxide selected from the group consisting of $Nb_2O_5$, $NbO_2$ and $Nb_2O_3$, and (2) metallic niobium, wherein the niobium oxide and metallic niobium are present in powder or granular form;
   b) forming a compact of the mixture;
   c) reacting the compact of the mixture with a heat source to a temperature greater than about 1800° C.;
   d) solidifying the reacted mixture to form a body of material; and
   e) fragmenting the body of material to form the NbO powder.

2. The method as recited in claim 1, wherein the weight ratio of $Nb_2O_5$ to metallic niobium in the mixture is about 1:1.

3. The method as recited in claim 1, wherein the weight ratio of $NbO_2$ to metallic niobium in the mixture is about 1.3:1.

4. The method as recited in claim 1, wherein the weight ratio of $Nb_2O_3$ to metallic niobium in the mixture is about 2.5:1.

5. The method as recited in claim 1, wherein the niobium oxide is $Nb_2O_5$.

6. The method as recited in claim 1, wherein the heat source is an electron beam furnace.

7. The method as recited in claim 1, wherein the heat source is a plasma-arc furnace.

8. The method as recited an claim 1, wherein the heat source is an induction furnace.

* * * * *